United States Patent [19]

Robbins

[11] 4,038,727

[45] Aug. 2, 1977

[54] OPENABLE AND CLOSEABLE SELF-TIGHTENING CLIP

[76] Inventor: F. Peter Robbins, Box 332, Northfield, Ill. 60093

[21] Appl. No.: 714,579

[22] Filed: Aug. 16, 1976

[51] Int. Cl.² .................................... A44B 21/00
[52] U.S. Cl. ........................ 24/248 C; 24/248 FS; 24/248 SL
[58] Field of Search ........ 24/243 CH, 243 FS, 243 P, 24/243 K, 243 M, 243 N, 243 R, 248 R, 248 C, 248 FS, 248 PC, 248 BC, 248 L, 248 SL, 249 SL, 241 S, 241 TC

[56] References Cited

U.S. PATENT DOCUMENTS

| 790,012 | 5/1905 | Swope | 24/248 C |
|---|---|---|---|
| 790,113 | 5/1905 | Swope | 24/248 C |
| 3,225,407 | 12/1965 | Daniels | 160/392 |
| 3,742,560 | 7/1973 | Kessler | 24/248 SL |

Primary Examiner—Paul R. Gilliam
Assistant Examiner—Kenneth J. Dorner
Attorney, Agent, or Firm—McCaleb, Lucas & Brugman

[57] ABSTRACT

Three-piece clip comprises two plier-like lever members and a slat-like core member, all fabricated from flat sheet metal or plastic stock. The lever members have handle and jaw portions respectively, rearwardly and forwardly of a pivoted joint and are relatively movable between opened and closed positions in which a gap defined by lips of the jaw portions and controlling access to a hook space inside is enlarged and reduced. The core member, with a section of flexible sheeting material wrapped around it is inserted into the hook space between the jaw members in opened position and then closed by squeezing the handle portions together. Detent means between the rearward ends of the handle portions hold the clip in closed position. The detent means comprises a hook on the rearward end of one of the handle portions engaging the rearward end of the other handle portion. The handle portions with the hook is bowed to impart longitudinal springiness to it. The pivotal joint is a rockable connection between the two lever members provided by the handle portion of one lever member inserted through a slot in an intermediate portion of the other and held by a tang.

10 Claims, 16 Drawing Figures

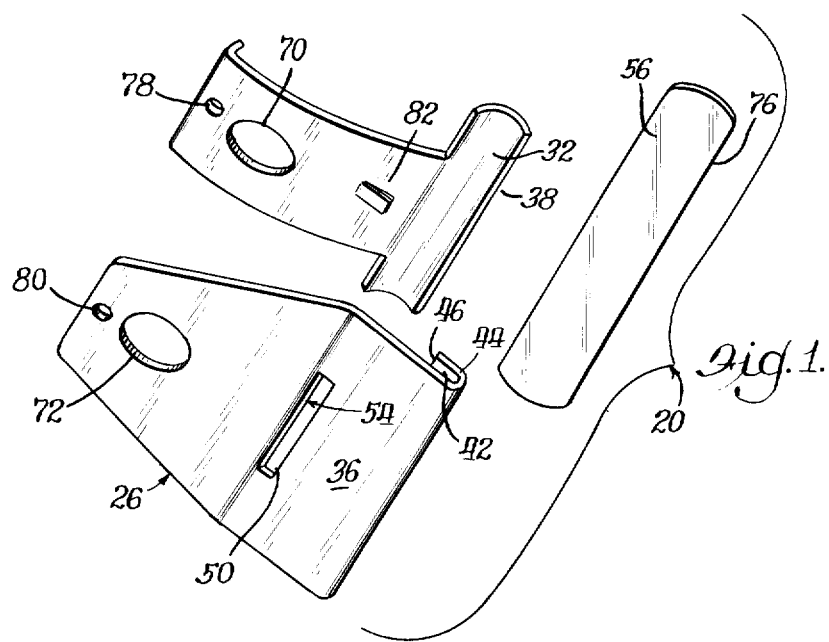
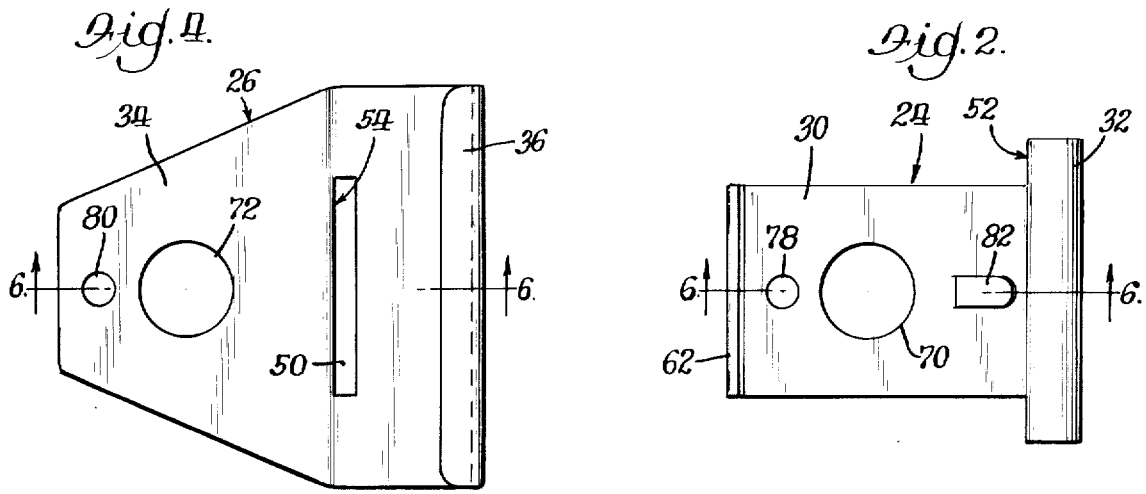
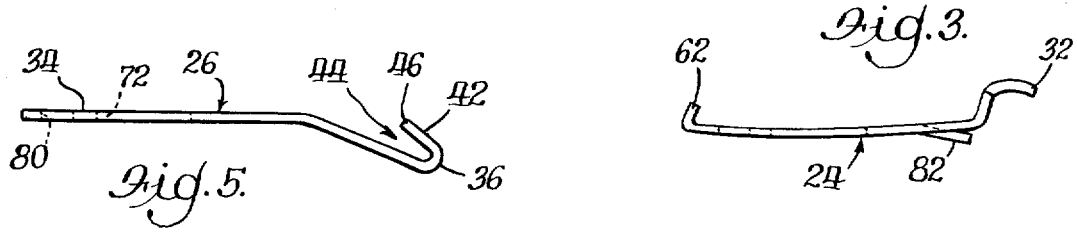
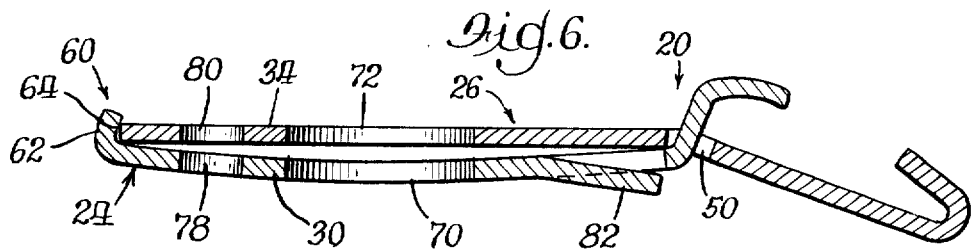

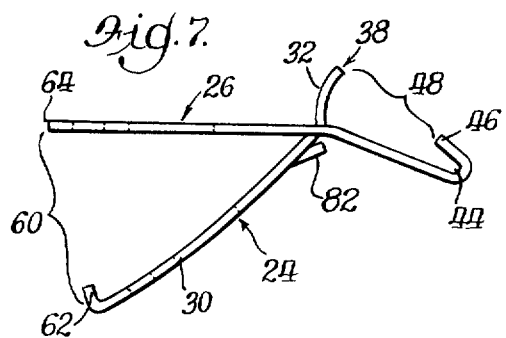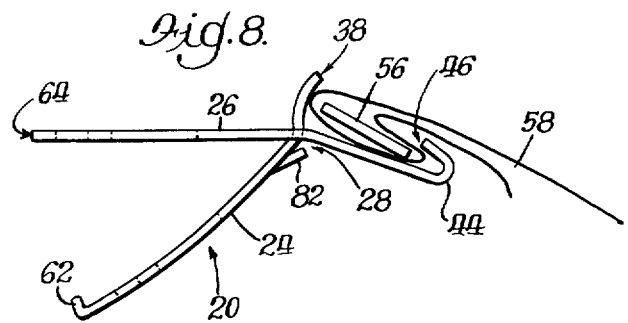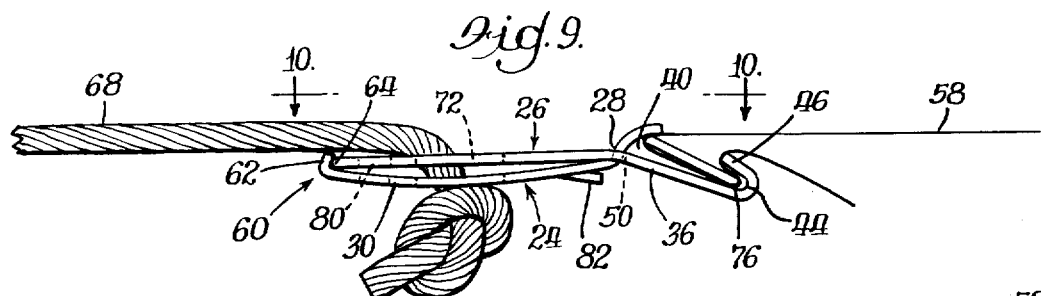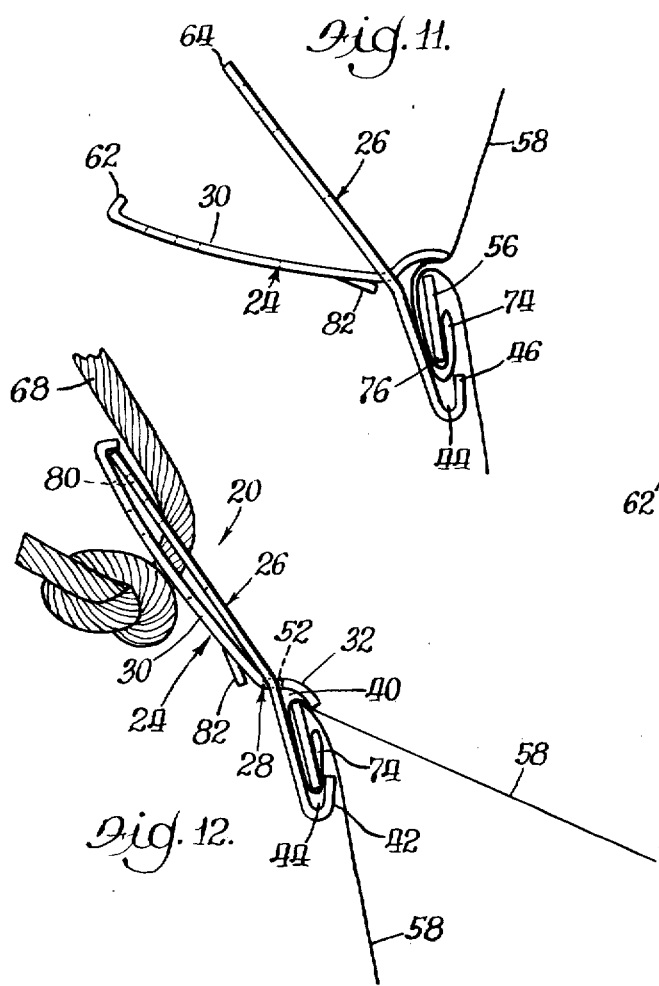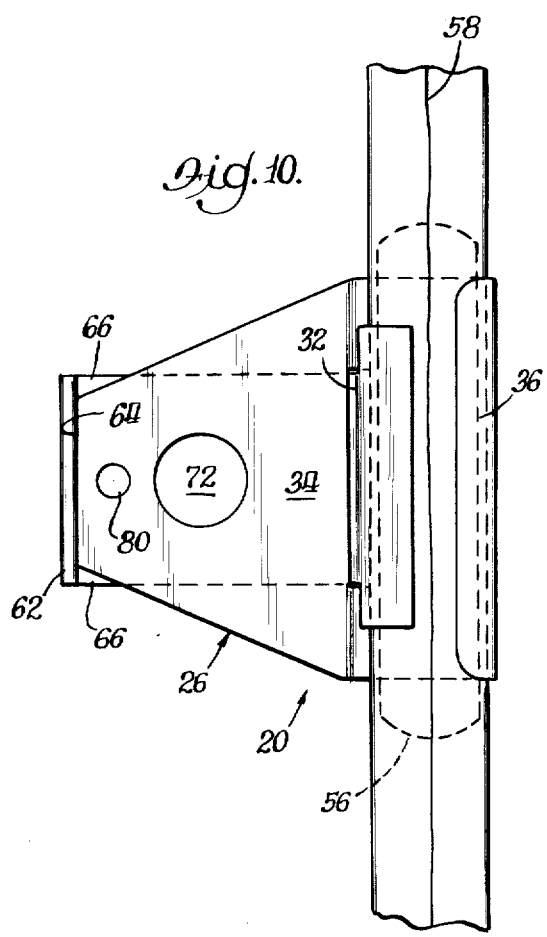

OPENABLE AND CLOSEABLE SELF-TIGHTENING CLIP

BACKGROUND OF THE INVENTION

The invention belongs to the field of clips or clamps for flexible sheeting materials such as plastic, fabric or canvas for tents, load covers or the like, which may be classified in Patent Office Classification 24/243.

In the past, flexible sheeting materials used as sails, tents, covers, tarpaulins for various applications such as construction projects, stored machinery, and railway and truck cargo, have been canvas. Grommets or eyelets punched through the material have been provided conventionally for gripping the flexible sheeting with rope or other fasteners. Their disadvantages are well-known, because making holes through the sheeting, even in the heaviest of canvas tarpaulins and the like, weakens them. Sooner or later they tear loose. Other disadvantages of grommets is that they are at fixed locations, allowing no option of gripping the sheeting somewhere else; and their use is generally limited to the edge portions of the sheeting because placing them in the center would make an undesirable hole and prevent it from being weather-proof. Plastic sheeting has replaced canvas for many of these uses. This is primarily because of lower cost but there are added advantages of light weight, compactness in storage, and resistance to rot and many chemicals. Most of the plastic sheeting materials are extremely tough and tear-resistant as long as they remain imperforate. But holes for grommets provide starting places for rips and make them unsuitable for heavy duty applications.

Attempts have been made to provide special clips for use in thin plastic sheeting materials which do not require the punching of holes, but none of these have been sufficiently satisfactory to become commercial to any significant extent. One such special clip is shown in Daniels U.S. Pat. No. 3,225,407 but this has a one-piece, non-adjustable jaw assembly incapable of being manually tightened, and because it requires constant tension loading to keep it fastened, it does not positively grip the flexible sheeting material for heavy duty use as does the clip of the present invention.

SUMMARY OF THE INVENTION

A general object of the present invention is to provide a clip which can be manually attached to and released from flexible sheeting material, which is self-tightening, and which maintains the flexible sheeting material in unpunctured, weather-proof condition.

Another object is to provide in such a clip a snaplock plier-grab mechanism which can be attached and reattached to any desired locations on the sheeting material — along an edge, or in the middle, or one side or the other.

Another object is to provide such a clip in which the flexible sheeting material is wrapped about a core clamped within the clip, to spread the pulling load on the clip and thereby reduce stress concentration and minimize tendency to tear out the material.

Another object is to provide such a clip which is readily adapted for use with different thicknesses of flexible sheeting materials simply by using slat-like cores of different cross-sectional dimensions.

BRIEF DESCRIPTION OF THE DRAWINGS

Other objects and advantages will be apparent from the following description taken in connection with the accompanying drawings in which:

FIG. 1 is an exploded perspective view of a preferred form of clip embodying the present invention comprising two plier-like lever members and a slat-like core member;

FIG. 2 is a top plan view of one of the lever members shown in FIG. 1;

FIG. 3 is an edge view of FIG. 2;

FIG. 4 is a top plan view of the other of the lever members shown in FIG. 1;

FIG. 5 is an edge view of FIG. 4;

FIG. 6 is an enlarged longitudinal sectional view of the lever members shown in FIGS. 2 and 4, taken along lines 6—6, showing these two members in their closed position;

FIG. 7 is a side view of the lever members in opened position showing them ready to receive flexible sheeting material wrapped about the core;

FIG. 8 is similar to FIG. 7 illustrating the next step in which the core with an edge portion of the flexible sheeting material wrapped about it is inserted in the jaw portions of the lever members, ready for closing;

FIG. 9 illustrates the next step beyond FIG. 8, namely where the clip is snap closed and the sheeting material is held taut by tension loading applied through fastening means such as an anchoring rope, nail, wire or bolt;

FIG. 10 is a top view of FIG. 9, taken in the direction of arrows 10—10;

FIG. 11 is a view similar to FIG. 8 illustrating an initial step in clamping an intermediate or center portion of the flexible sheeting material;

FIG. 12 is a view similar to FIG. 9, illustrating the next step beyond FIG. 11, namely where the clip is closed, and the intermediate or central portion of the flexible sheeting material is anchored by fastening means such as a rope or the like;

Like parts are referred to by like reference characters.

DESCRIPTION OF THE PREFERRED EMBODIMENT

Figure 13:
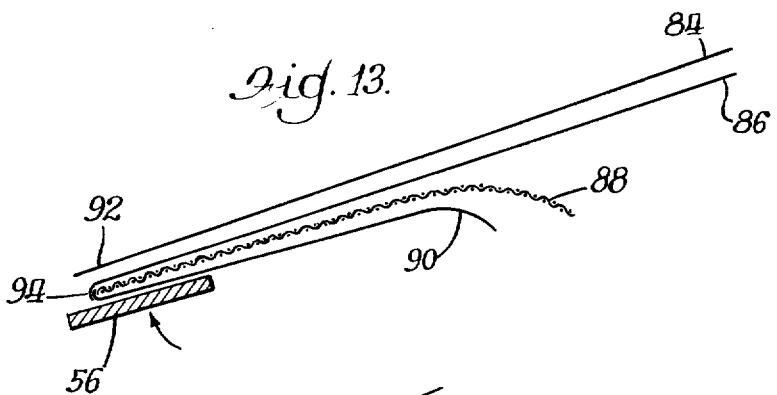
FIG. 13 is a cross-sectional view of a core and multiple plies of tent material showing the first step in using the clip at the intersection of the roof side wall for gripping several sheets at once.
Figure 14:
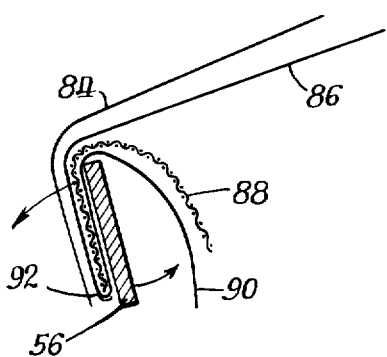
FIGS. 14 and 15 are further steps in fastening the clip to the tent.
Figure 15:
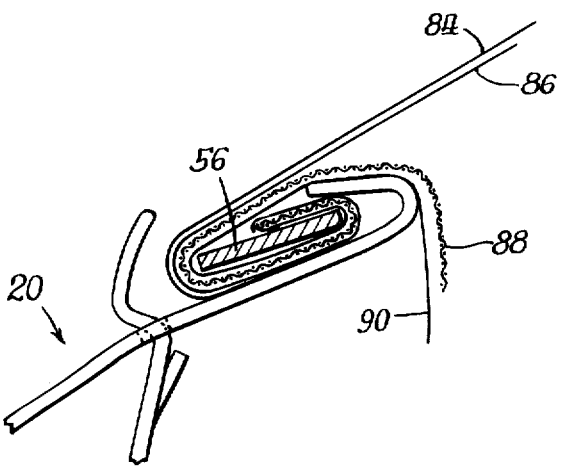

A preferred embodiment of an openable and closeable self-tightening clip for flexible sheeting materials is illustrated. This is generally designated 20. It is fabricated from flat sheet stock such as cold-rolled sheet steel or plate or a suitable plastic material.

Clip 20 comprises two plier-like lever members 24 and 26 connected by a pivotal joint generally designated 28. For convenience, and uniformity, in the following description and in the claims, the right and left hand portions of the clip embodiments illustrated will be designated forward and rearward portions respecively. Thus, one lever member 24 has a handle portion 30 rearwardly of the pivotal joint, and jaw portion 32 forwardly of it. Likewise, the other lever member 26 has a handle portion 34 rearwardly of the pivotal joint, and a hook-like jaw portion 36 forwardly of it.

Jaw portion 32 of the one lever member 24 terminates at its forward end in a lock lip 38 and is curved to define with the rear part of the other jaw portion 36 a forwardly facing pocket 40. Jaw portion 36 of the other lever member has a front end part or hook 42 curved rearwardly substantially 180° on itself to define a rearwardly facing hook pocket 44 which terminates in another lip 46. Lips 38 and 46, and pockets 40 and 44 extend a substantial width, approximately two inches or more parallel to the axis of the pivotal joint 28, to spread the load and eliminate stress concentration in the flexible sheeting material, as will be explained. The lips 38 and 46 define between them a slot-like gap 48 (FIG. 7), likewise extending generally parallel to the axis of the pivotal joint 28. This gap is variable between the opened position of FIG. 7 and the closed position of FIG. 9 where it is clamped upon the sheeting and core (both to be described).

The one lever member 24 is generally T-shaped, the jaw portion 32 thereof being wider than the handle portion 30. The latter is so dimensioned that when assembled it fits through a transverse slot 50 formed in an intermediate portion of the other lever member 26. When so assembled, the rear edges 52, 52 of lever member 24 function in the manner of scissor knife-edge pivots against the topside of the other lever member 26. Alternatively, depending on the exact construction and the fit of parts, the back edge 54 of lever member 26 may function as a knife-edge pivot, bearing against the upper surface of the lever member 24. Thus, the axis of pivotal joint 28 may be along edges 52, 52; or 54; or somewhere between.

A tang 82 is struck from the body of lever member 24 and renders the latter slightly thicker than the width of slot 50 to hold the lever members together when snap assembled.

A core member 56 will preferably be non-circular in cross section, to prevent rotation under load. In the present case, it is a flat, rectangular, slat-like punching from flat sheet stock preferably of some suitable plastic material with smooth edges and corners. Its thickness and width dimensions will depend on the thickness of the flexible sheeting material 58 to which it is attached. An important function is to reduce stress concentration in the sheeting by spreading the connecting load along the length of the core member. This is in contrast to the more concentrated or point load for grommets and the like. The slat-like core member is hook-locked in a plier, hook-grab, in turn yielding an anchor point and locks the core member from rotation under torque.

Detent means, generally designated 60, at the rearward ends of the lever member handle portions 30 and 34 releasably lock them in closed position as shown in FIGS. 6, 9 and 12. The detent means in this case comprises a right-angled hook 62 (FIG. 6) at the rearward end of the one lever member 24, releasably engagable with the rearward end 64 of the other lever member 26. The handle portion of the one lever member 24 is bowed concavely toward the other lever member. This imparts a slight, longitudinal springiness. Being fabricated preferably from sheet metal stock or an equivalent material, it is sufficiently elastic for the present purposes to bias the hook 62 in a forward direction and press it elastically and releasably against the end surface 64 as shown. These detent elements will of course be disengaged when the handle portions 30 and 34 are pressed or pried apart. To facilitate pressing them apart, FIG. 10 shows that at least the rear end portion of the one handle portion 30 is somewhat wider than the corresponding rear end portion of the other handle portion 34. This provides in effect a pair of projections or ears 66 which can be gripped between a person's fingers or thumbs.

To fasten clip 20 to an edge portion of flexible sheeting 58, the lever members 24 and 26 are assembled in open position as shown in FIG. 7 with the tang 82 behind the slot 50. Then, the core member 56 with the end of the flexible sheet 58 wrapped around it is inserted through the gap 48 into the hook space between jaw portions 32 and 36 as shown in FIG. 8. Finally, the handle portions 30 and 34 are squeezed together, hook 62 is snapped over the end surface 64, and tension loading means such as a rope 68 is threaded through holes 70 and 72 in the handle portions, and tensioned, all as shown in FIG. 9. The sheeting-encased slat-like core member, under loading, is torque-locked against rotation and generates a capstan-type friction engagement with the jaw portions 32 and 36, gripping them in a self-tightening manner. The more the pull the greater the grip. Alternatively, the clip may be anchored by a nail, bolt or hook through holes 78 and 80 which also locks the clip shut. When tensioned, the anchor axis, along rope 68, is aligned with the sheeting 56. The hook-like jaw portion 36 of lever member 26 is diagonally disposed relative to the handle portion 34. By this means, the lip 46 is offset from the sheeting 58 out of contact therewith when tensioned as shown in FIG. 9. This keeps wind whip and like vibration from wearing holes in the sheeting.

The clip may be fastened to an intermediate or central portion of the sheeting 58, away from any edge, as shown in FIGS. 11 and 12. In FIG. 11, a doubled portion 74 of the flexible sheeting material is wrapped about the core 56 and hooked into the open clip. The clip is then closed manually by squeezing the handle portions together as described above, and fastening means such as rope 68 is attached in the same manner as shown in FIG. 9. This intermediate type fastening may be used for example in the middle of a large tent panel to prevent excessive sag in a roof section or to enlarge the space inside a wall panel.

To remove the clip 20 from the flexible sheeting 58 in either the FIG. 9 or 12 positions, all that is required is that the handle portions 30 and 34 be opened, as described, by pressing on the ears 66 and hook 62 (FIGS. 6 and 10); or prying the handle portions 30 and 34 apart with a screwdriver of knife to overcome the releasable detent connection 60.

When assembled, as shown in FIG. 9, the clip compresses the sheeting 58 against the core member 56 and is self-tightening. A pull on the sheeting causes the forward edge 76 of the core member to press the sheeting forwardly into the pocket 44. Thus, the greater the pull placed on the flexible sheeting, the more secure the grip. An important function of the slat-like core member 56 is to lock the sheeting in alignment with the pull on the clip. The jaw portion 32, when assembled as shown in FIG. 9, functions as a lock-lip, plier-grab element torque-locking the slat-like core member against rotation while spreading the load along the sheeting to minimize stress concentration.

FIGS. 13–16 show how the clip 20 may be used at the intersection of a tent roof and side wall, to bind multiple tarps or sheetings, for example, fly tarp 84, roof tarp 86, wall insect screen 88 and wall tarp 90. In the illustration, the fly tarp 84 and wall screen 88 are separate edge-gripped sheets. Roof and wall tarps 86 and 90 may be continuations of one another.

Figure 16:
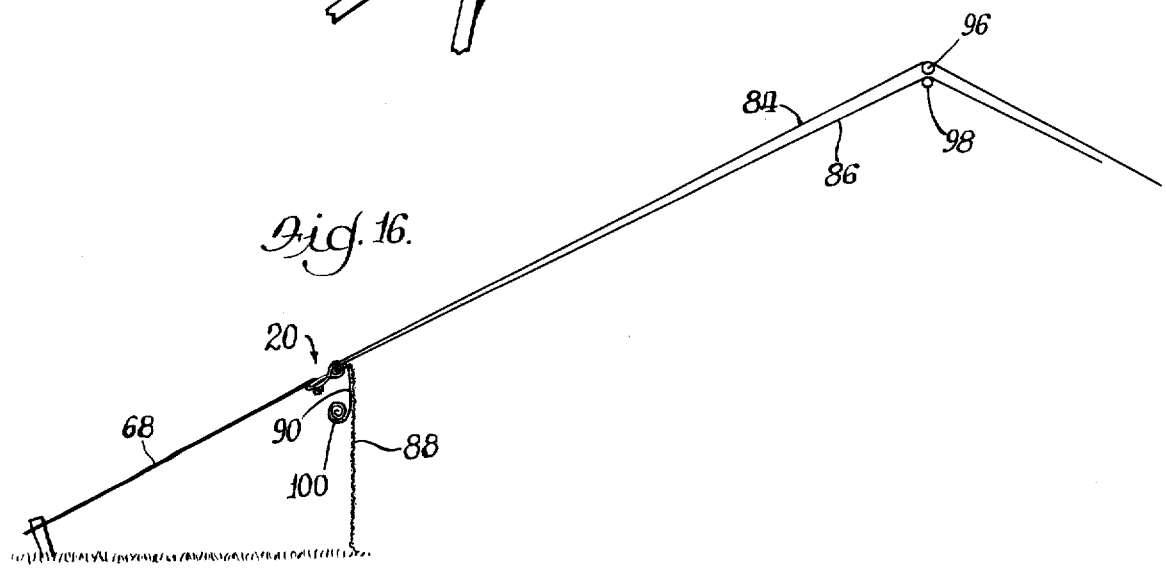
FIG. 16 is a fragmentary cross-section of a tent showing the clip in place.

As shown in FIG. 13, the wall and roof tarp portions will be folded to enclose the edge of wall screen 88, and fly tarp 84 will be laid over it with its edge 92 lying alongside the fold 94. This will be placed on one face of the slat-like core member 56. Next, the core member and sheetings will be rotated in the direction of the arrows shown in FIG. 14, a full 360°, to the position shown in FIG. 15 where it is shown assembled within the clip just prior to closing the clip. The finished tent cross-section is shown in FIG. 16 where the fly tarp 84 and roof tarp 86 are respectively stretched over ridge poles 96 and 98. The wall tarp 90 is partially rolled up as shown at 100 to allow ventilation through the screen 88.

While a preferred embodiment of the improved clip has been shown and described, it will be apparent to those skilled in the art that other specific constructions and arrangements are possible within the scope and spirit of the invention as covered by the following claims. For example, where the sheeting material 58 is a conventional tarpaulin having the usual hem or seam along an edge providing an elongated pocket therein, the core member(s) 56 may be permanently or temporarily fitted within the pocket. Further, referring to the assemblies in FIGS. 9 and 12, the sheeting member 58 may be wrapped about the core member 58 once as shown, or twice, or any number of times as required to provide a proper grip on the sheeting. And, whereas a simple piece of sheeting material 58 is illustrated in FIGS. 8–12, a number of different sheeting materials may be wrapped around a single core member and held by a single clip as shown in FIGS. 13–16.

The embodiments of the invention in which an exclusive property or privilege is claimed are defined as follows:

1. An openable and closeable self-tightening clip for flexible sheeting material comprising two plier-like lever members connected by a pivotal joint;

each of said lever members having handle and jaw portions respectively rearwardly and forwardly of said pivotal joint;

said jaw portions enclosing a hook-like space within them and terminating in elongated lips defining between them a slot-like gap extending generally parallel to the axis of said pivotal joint and providing access to said hook-like space;

said lever members being relatively movable between opened and closed positions in which said gap is respectively enlarged and reduced;

an elongated core member adapted to have sheeting material wrapped around it and to be set into the hook-like space within said jaw portions through said slot-like gap when said lever members are in said opened position, said core member and said hook-like space having non-circular cross-sections preventing rotation of said core member under tension applied to said sheeting material and thereby torque-locking said core member and sheeting material within said space, said sheeting material extending through said gap out of said clip from between one of said jaw portions and one edge of said core member seated thereon;

said sheeting material being compressed between said jaw portions and said core member when said lever members are in said closed position so that, when tension is applied to said sheeting material, an edge of said core member opposite said one edge and said sheeting material wrapped around it are pulled against the other of said jaw portions to retain said sheeting material in a self-tightening manner; and, detent means between the rearward ends of said lever member handle portions releasable locking said lever members in said closed position.

2. An openable and closeable self-tightening clip according to claim 1 in which said detent means comprises a hook at the rearward end of one of said lever members releasably engageable with the rearward end of the other lever member to lock said lever members releasably in said closed position.

3. An openable and closeable self-tightening clip according to claim 2 in which the handle portion of said one lever member is elastic and bowed concavely to bias said hook in a forward direction to engage said rearward end of said other lever member.

4. An openable and closeable self-tightening clip according to claim 1 in which said lever members are fabricated from flat sheet metal stock, and said pivotal joint comprises a transverse slot in an intermediate portion of one of said lever members, the other of said lever members having an intermediate portion rockably engaged with said one lever member within said slot.

5. An openable and closeable self-tightening clip according to claim 4 in which said one lever member has its handle portion dimensioned for assembling by insertion through said slot in said other lever member, said one lever member has its jaw portion wider than said slot to engage the underside of said other lever member edge-wise to thereby limit insertion of said handle portion of said one lever member through said slot and to provide a fulcrum for relative pivotal movement between said lever members.

6. An openable and closeable self-tightening clip according to claim 4 in which said other of said lever members has a tang formed therein to render said other lever member slightly thicker than said transverse slot to hold said lever members together when snap assembled.

7. An openable and closeable self-tightening clip according to claim 1 in which one of said lever members has a front portion thereof curved to define with said other lever member a forwardly facing pocket which terminates in said lip of said one lever member;

the other one of said lever members has a front portion thereof curved backwardly substantially 180° on itself to define a rearwardly facing pocket which terminates in said lip of said other lever member; and said forwardly and rearwardly facing pockets enclosing opposite edges of said core member in said closed position of said clip to facilitate torque-locking said core member and sheeting material in said pockets.

8. An openable and closeable self-tightening clip according to claim 7 in which said lever members and said core member are fabricated from flat sheet stock;

said core member is a flat rectangular section of flat sheet stock;

said detent means comprises a hook at the rearward end of one of said lever members releasably engagable with the rearward end of the other lever member to lock said lever members releasably in said closed position; and said other lever member being sufficiently wider than the handle portion of said one lever member for manually grasping it to facilitate opening said clip when in said closed position.

9. An openable and closeable self-tightening clip according to claim 8 in which said core member extends parallel to the width of said jaw members, and has a length at least as great as said width of said jaw members to spread the gripping load of said clip on said flexible sheeting material for the full width of said jaw and core members.

10. An openable and closeable self-tightening clip according to claim 7 in which the jaw portion of said other lever member is diagonally disposed relative to the handle portion thereof to offset the lip of said other lever member from said sheeting out of contact therewith when tensioned by the clip, to thereby avoid abrasion of the sheeting by said lip due to wind whip and like vibration.

* * * * *